(12) United States Patent
Pazos et al.

(10) Patent No.: US 8,470,927 B2
(45) Date of Patent: Jun. 25, 2013

(54) PROCESS FOR PRODUCTION OF POLYMER POLYOLS

(75) Inventors: Jose F. Pazos, Charleston, WV (US); John E. Hayes, Gibsonia, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1660 days.

(21) Appl. No.: 10/788,066

(22) Filed: Feb. 26, 2004

(65) Prior Publication Data

US 2005/0192369 A1    Sep. 1, 2005

(51) Int. Cl.
*C08G 18/63* (2006.01)

(52) U.S. Cl.
USPC ......... 524/762; 524/500; 524/502; 524/765; 524/769; 521/137; 252/182.27

(58) Field of Classification Search
USPC ............ 521/170, 174, 137; 524/500, 502, 524/762, 765, 769; 252/182.27
See application file for complete search history.

(56) References Cited

U.S. PATENT DOCUMENTS

| | | | |
|---|---|---|---|
| 3,404,109 A | 10/1968 | Milgrom | 260/611 |
| 3,427,256 A | 2/1969 | Milgrom | 252/431 |
| 3,427,334 A | 2/1969 | Belner | 260/429 |
| 3,427,335 A | 2/1969 | Herold | 260/429 |
| 3,538,043 A | 11/1970 | Herold | 260/40 |
| 3,829,505 A | 8/1974 | Herold | 260/611 B |
| 3,900,518 A | 8/1975 | Milgrom | 260/573 |
| 3,941,849 A | 3/1976 | Herold | 260/607 A |
| 4,472,560 A | 9/1984 | Kuyper et al. | 526/120 |
| 4,477,589 A | 10/1984 | van der Hulst et al. | 502/169 |
| 5,059,641 A | 10/1991 | Hayes et al. | 523/456 |
| 5,070,141 A | 12/1991 | Gastinger et al. | |
| 5,145,883 A | 9/1992 | Saito et al. | 521/172 |
| 5,158,922 A | 10/1992 | Hinney et al. | 502/175 |
| 5,196,476 A | 3/1993 | Simroth | 524/769 |
| 5,470,813 A | 11/1995 | Le-Khac | 502/175 |
| 5,482,908 A | 1/1996 | Le-Khac | 502/156 |
| 5,488,086 A | 1/1996 | Umeda et al. | 525/92 A |
| 5,536,883 A | 7/1996 | Le-Khac | 568/620 |
| 5,545,601 A | 8/1996 | Le-Khac | 502/156 |
| 5,627,120 A | 5/1997 | Le-Khac | 502/156 |
| 5,637,673 A | 6/1997 | Le-Khac | 528/405 |
| 5,689,012 A | 11/1997 | Pazos et al. | 568/619 |
| 5,712,216 A | 1/1998 | Le-Khac et al. | 502/175 |
| 5,777,177 A | 7/1998 | Pazos | 568/679 |
| 5,789,626 A | 8/1998 | Le-Khac | 568/620 |
| 5,814,699 A | 9/1998 | Kratz et al. | 525/53 |
| 5,854,386 A | 12/1998 | Shen et al. | 528/403 |
| 5,955,534 A | 9/1999 | Simroth et al. | |
| 5,958,994 A * | 9/1999 | Lear et al. | 521/174 |
| 5,990,185 A | 11/1999 | Fogg | 521/112 |
| 5,990,232 A * | 11/1999 | Shen et al. | 524/762 |
| 6,013,731 A | 1/2000 | Holeschovsky et al. | 525/123 |
| 6,018,017 A | 1/2000 | Le-Khac | 528/421 |
| 6,066,683 A | 5/2000 | Beisner et al. | |
| 6,143,802 A | 11/2000 | Simroth et al. | |
| 6,455,603 B1 | 9/2002 | Fogg | 521/137 |
| 2003/0181598 A1 | 9/2003 | Heyman et al. | 525/242 |
| 2003/0220410 A1 | 11/2003 | Heinis et al. | 521/134 |

FOREIGN PATENT DOCUMENTS

| | | | |
|---|---|---|---|
| EP | 0768324 | * | 4/1997 |
| JP | 4-145123 | | 5/1992 |
| JP | 6-228247 | | 8/1994 |
| JP | 11315138 A | | 11/1999 |

* cited by examiner

*Primary Examiner* — John Cooney

(74) *Attorney, Agent, or Firm* — N. Denise Brown; John E. Mrozinski, Jr.

(57) ABSTRACT

The present invention provides a process for preparing a polymer polyol (PMPO) by alkoxylating a starter compound(s) having active hydrogen atoms in the presence of a double metal cyanide (DMC) catalyst, radical initiator(s) and optionally PMPO stabilizers and simultaneously polymerizing unsaturated monomer(s) with radical initiator(s). The polymer polyols (PMPOs) made by the inventive process may find use in the preparation of polyurethane foams and elastomers.

12 Claims, No Drawings

PROCESS FOR PRODUCTION OF POLYMER POLYOLS

FIELD OF THE INVENTION

The present invention relates in general, to polymer polyols, and more specifically, to a process for preparing a polymer polyol (PMPO) by alkoxylating a starter compound having active hydrogen atoms in the presence of a double metal cyanide (DMC) catalyst and simultaneously polymerizing unsaturated monomer(s) with radical initiator(s).

BACKGROUND OF THE INVENTION

Polymer polyols (PMPOs) are employed in the preparation of polyurethane foams and elastomers and are extensively used on a commercial scale. Polyurethane foams made from such polymer polyols have a wide variety of uses. The two major types of polyurethane foams are slabstock and molded foam. Polyurethane slabstock foams are used in carpet, furniture and bedding applications. Molded polyurethane foams are used in the automotive industry for a broad range of applications.

Polymer polyols are typically produced by polymerizing one or more ethylenically unsaturated monomers dissolved or dispersed in a prepared polyol in the presence of a free radical catalyst to form a stable dispersion of polymer particles in the polyol. Typically, polymer polyols used to produce polyurethane foams having higher load-bearing properties than those produced from unmodified polyols were prepared using acrylonitrile monomer; however, many of those polymer polyols have undesirably high viscosity.

Polyurethane foams having high load-bearing properties are predominantly produced using polymer polyols that are prepared from a high styrene content monomer mixture (for example, 65 to 75 percent styrene). However, polymer polyols produced from such high styrene monomer mixtures often fail to satisfy the ever more demanding needs of industry, including acceptable viscosity, strict stability requirements and increased load-bearing properties.

Stability and low viscosity of polymer polyols are of increasing importance to polyurethane foam manufacturers due to the development of sophisticated, high speed and large volume equipment and systems for handling, mixing and reacting polyurethane-forming ingredients. Polymer polyols must meet certain minimum polymer particle size requirements to avoid plugging or fouling filters, pumps and other parts of such foam processing equipment in relatively short periods of time.

Numerous attempts have been made to produce polymer polyols that will satisfy the above criteria. In particular, Japanese laid-open patent application, Kokai No. 6-228247, teaches a semibatch process for making a polymer polyol by the sequential addition of oxide monomer and its polymerization followed by addition of vinyl monomers and their polymerization in the same reactor. Although the Japanese laid-open application teaches that removal of the DMC catalyst is not required, it fails to even suggest that the processing steps could be anything other than sequential. Thus, while one skilled in the art might infer from reading Kokai '247 that DMC catalysts do not interfere with free radical polymerization, Kokai '247 provides no guidance concerning whether free radical polymerization interferes with DMC catalysis.

A number of workers have patented continuous processes for producing polyols, such as U.S. Pat. No. 5,689,012, issued to Pazos et al., which discloses a continuous process for the preparation of polyoxyalkylene polyethers using DMC catalysts as the polyoxyalkylation catalyst and employing continuous addition of alkylene oxide in conjunction with continuous addition of starter and catalyst to a continuous oxyalkylation reactor. The polyether products are said to be exceptionally well suited for use in polymer forming systems, particularly polyurethanes. In the process of Pazos et al., polyol synthesis begins with introduction of catalyst/starter into the continuous reactor, initiation of oxyalkylation, and while oxyalkylation progresses, continuous addition of catalyst, starter and alkylene oxide with continuous removal of polyol product. The process of Pazos et al. adds "fresh" catalyst or pre-activated catalyst.

U.S. Pat. No. 5,777,177, issued to Pazos, teaches a process for making double metal cyanide-catalyzed polyols involving making a polyether polyol by polymerizing an epoxide in the presence of a double metal cyanide (DMC) catalyst, a continuously added starter ($S_c$), and optionally, an initially charged starter ($S_i$). The continuously added starter has at least about 2 equivalent percent of the total starter used (total starter=$S_c$+$S_i$). Although conventional processes for making DMC-catalyzed polyols charge the entire starter to be used to the reactor at the start of the polymerization, the process of Pazos adds both the epoxide and the $S_c$ continuously to the reaction mixture during the polymerization.

U.S. Pat. No. 5,059,641, issued to Hayes et al., discloses very low viscosity PMPOs having high styrene/acrylonitrile ratios and good stability which are produced with epoxy-modified polyols as dispersants. The epoxy-modified polyol dispersant may be made by one of three methods: (1) adding the epoxy resin internally to the modified polyol, (2) capping or coupling a polyol not containing an epoxy resin with such a resin, or (3) providing the epoxy resin both internally to the polyol and as a cap or coupler. Epoxy-modified polyols having a hydroxyl to epoxy ratio of about 8 or less, made by one of these techniques, are said to be superior dispersants and provide polymer polyols having higher styrene contents, improved stability and viscosity properties.

Numerous patents disclose the continuous and semi-batch preparation of PMPOs, including processes where the base polyol is a DMC-catalyzed polyol. Heretofore, as exemplified in those patents, the process is sequential, i.e., a polyol is prepared first which is reacted with unsaturated monomers in a subsequent step.

Therefore, a need exists in the art for a simultaneous process for preparing a polymer polyol (PMPO) directly from starter compound having active hydrogen atoms, alkylene oxide(s), double metal cyanide (DMC) catalyst, unsaturated monomer(s) and radical initiator(s).

SUMMARY OF THE INVENTION

Accordingly, the present invention provides a process for preparing a polymer polyol (PMPO) directly from a starter compound(s) having active hydrogen atoms, in the presence of a double metal cyanide (DMC) catalyst, unsaturated monomer(s) radical initiator(s) and optionally PMPO stabilizers, by alkoxylating the starter compound(s) and simultaneously polymerizing the unsaturated monomer(s) with radical initiator(s). Because the inventive process may be carried out in one vessel, it may eliminate the need for multi-step or multi-stage processes and thus make more efficient use of reactors and storage tanks. The process of the present invention may be continuous or semibatch and the polymer polyols made thereby may find use in the preparation of polyurethane foams and elastomers.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, hydroxyl numbers, functionalities and so forth in the specification are to be understood as being modified in all instances by the term "about."

The present invention provides a process for preparing a polymer polyol (PMPO) involving combining in a reactor at least one starter compound containing active hydrogen atoms, a double metal cyanide (DMC) catalyst, at least one unsaturated monomer, at least one radical initiator, at least one alkylene oxide and optionally, at least one polymer polyol (PMPO) stabilizer, simultaneously alkoxylating the starter and polymerizing the monomer with at least one radical initiator and removing the polymer polyol (PMPO) from the reactor.

The present invention also provides a continuous process for preparing a polymer polyol (PMPO) involving a) introducing, into a continuous reactor, sufficient DMC catalyst/initial starter mixture to initiate polyoxyalkylation of the initial starter after introduction of alkylene oxide into the reactor, b) continuously introducing into the reactor at least one continuously added starter, c) continuously introducing into the reactor fresh DMC catalyst and/or further DMC catalyst/further starter mixture such that catalytic activity is maintained, d) continuously introducing into the reactor at least one unsaturated monomer, e) continuously introducing into the reactor at least one radical initiator, f) continuously introducing into the reactor at least one alkylene oxide to produce a polymer polyol product; and g) continuously removing the polymer polyol product from the reactor.

The starter compound in the inventive process may be any compound having active hydrogen atoms. Preferred starter compounds include, but are not limited to, compounds having number average molecular weights from 18 to 2,000, more preferably, from 62 to 2,000, and having from 1 to 8 hydroxyl groups. Examples of such starter compounds include, but are not limited to, polyoxypropylene polyols, polyoxyethylene polyols, polytetatramethylene ether glycols, glycerol, propoxylated glycerols, propylene glycol, ethylene glycol, tripropylene glycol, trimethylol propane alkoxylated allylic alcohols, bisphenol A, pentaerythritol, sorbitol, sucrose, degraded starch, water and mixtures thereof.

In those embodiments of the inventive process wherein the process is continuous, the starter used to prepare the DMC catalyst/starter mixture is preferably an oligomeric starter, more preferably an oxyalkylated oligomer based on the same low molecular weight starter whose continuous addition is to be used in the continuous process. For example, where propylene glycol is to be continuously added to the reactor, a suitable oligomeric starter useful in preparing the activated catalyst/starter mixture would be a 300 Da to 1,000 Da molecular weight polyoxypropylene glycol. The same oligomeric starter would be suitable for use where dipropylene glycol or water will be the continuously added starters. Where glycerine is to be the continuously added starter, an oxypropylated glycerine polyol having a molecular weight of 400 Da to 1,500 Da is advantageously used. However, a feature of the present process is the ability to utilize essentially monomeric starters such as ethylene glycol, propylene glycol, and the like. Thus, the starter used to prepare the catalyst/starter mixture may be the same as the continuously added starter.

The continuously added starter may be water, ethylene glycol, diethylene glycol, triethylene glycol, propylene glycol, dipropylene glycol, tripropylene glycol, 1,2-, 1,3-, and 1,4-butylene glycols, neopentyl glycol, glycerine, trimethylolpropane, triethylolpropane, pentaerythritol, α-methylglucoside, hydroxymethyl-, hydroxyethyl-, and hydroxypropyl-glucosides, sorbitol, mannitol, sucrose, tetrakis[2-hydroxyethyl and 2-hydroxypropyl]ethylene diamines and other commonly used starters. Also suitable are monofunctional starters such as methanol, ethanol, 1-propanol, 2-propanol, n-butanol, 2-butanol, 2-ethylhexanol, and the like, as well as phenol, catechol, 4,4'-dihydroxybiphenyl, 4,4'-dihydroxydiphenylmethane, etc. Other suitable starters include those described in U.S. Pat. Nos. 3,900,518; 3,941,849; and 4,472,860, the entire contents of which are herein incorporated by reference thereto.

The continuously added starter may be essentially any polyoxyalkylene polymer or copolymer or suitable initiator for the production thereof, which has a molecular weight less than the desired product weight. Thus, the molecular weight of the continuously added starter may vary from 18 Da (water) to 45,000 Da (high molecular weight polyoxyalkylene polyol). It is much preferred to use continuously added starters with molecular weight less than 1,000 Da, preferably less than 500 Da, and most preferably less than 300 Da.

The term "continuous" as used herein may be defined as a mode of addition of a relevant catalyst or reactant in such manner so as to maintain an effective concentration of the catalyst or reactant substantially continuously. Catalyst input, for example, may be truly continuous, or may be in relatively closely spaced increments. Likewise, continuous starter addition may be truly continuous, or may be incremental. It would not detract from the present process to incrementally add a catalyst or reactant in such a manner that the added material's concentration decreases to essentially zero for some time prior to the next incremental addition. However, it is preferable that catalyst concentration be maintained at substantially the same level during the majority of the course of the continuous reaction, and that low molecular weight starter be present during the majority of the process. Incremental addition of catalyst and/or reactant which does not substantially affect the nature of the product is still "continuous" as that term is used herein.

The alkylene oxides useful in the present process include, but are not limited to, ethylene oxide, propylene oxide, oxetane, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. It is generally undesirable to employ ethylene oxide alone, but mixtures of propylene oxide and ethylene oxide with high ethylene oxide content, i.e., up to 85 mol percent, may be used effectively. Propylene oxide or mixtures of propylene oxide with ethylene oxide or another alkylene oxide are preferred. Other polymerizable monomers may be used as well, e.g., anhydrides and other monomers as disclosed in U.S. Pat. Nos. 3,404,109, 5,145,883 and 3,538,043, the entire contents of which are herein incorporated by reference thereto.

The process of the present invention may employ any double metal cyanide (DMC) catalyst. Suitable double metal cyanide (DMC) catalysts are well known to those skilled in the art. Double metal cyanide complex (DMC) catalysts are non-stoichiometric complexes of a low molecular weight organic complexing agent and optionally other complexing agents with a double metal cyanide salt, e.g., zinc hexacyanocobaltate.

Exemplary double metal cyanide (DMC) complex catalysts include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. The double metal cyanide (DMC) catalysts more preferred in the process of the present invention are those capable of preparing "ultra-low" unsaturation polyether polyols. Such catalysts are disclosed in U.S. Pat. Nos. 5,470,813, 5,482,908, and 5,545,601, the entire contents of which are herein incorporated by reference thereto. Most preferred in the process of the present invention are those zinc hexacyanocobaltate catalysts prepared by the methods described in U.S. Pat. No. 5,482,908.

The catalyst concentration is chosen so as to ensure a good control of the polyoxyalkylation reaction under the given reaction conditions. The catalyst concentration is preferably in the range from 0.0005 wt. % to 1 wt. %, more preferably in the range from 0.001 wt. % to 0.1 wt. %, most preferably in the range from 0.001 to 0.01 wt. %, based on the amount of polyether polyol to be produced. The catalyst may be present in the process of the present invention in an amount ranging between any combination of these values, inclusive of the recited values.

As those skilled in the art are aware, an organic complexing ligand may be included with the DMC catalyst. Any organic complexing ligand may be part of the DMC catalyst in the process of the present invention, such as the organic complexing ligands described in U.S. Pat. Nos. 3,404,109, 3,829,505, 3,941,849, 5,158,922 and 5,470,813, as well as in EP 700 949, EP 761 708, EP 743 093, WO 97/40086 and JP 4145123. Such organic complexing ligands include water-soluble organic compounds with heteroatoms, such as oxygen, nitrogen, phosphorus or sulfur, which can form complexes with the DMC compound. Preferred as organic complexing ligands, are alcohols, aldehydes, ketones, ethers, esters, amides, ureas, nitriles, sulfides and mixtures thereof. More preferred organic complexing ligands include water-soluble aliphatic alcohols, such as, for example, ethanol, isopropanol, n-butanol, iso-butanol, sec-butanol and tert-butanol. Tert-butanol is most preferred.

The DMC catalysts in the process of the present invention may optionally contain at least one functionalized polymer. "Functionalized polymer" as used herein is a polymer or its salt that contains one or more functional groups including oxygen, nitrogen, sulfur, phosphorus or halogen. Examples of functionalized polymers preferred in the inventive process include, but are not limited to, polyethers, polyesters, polycarbonates, polyalkylene glycol sorbitan esters, polyalkylene glycol glycidyl ethers, polyacrylamides, poly(acrylamide-co-acrylic acids), polyacrylic acids, poly(acrylic acid-co-maleic acids), poly(N-vinylpyrrolidone-co-acrylic acids), poly(acrylic acid-co-styrenes) and the salts thereof, maleic acids, styrenes and maleic anhydride copolymers and the salts thereof, block copolymers composed of branched chain ethoxylated alcohols, alkoxylated alcohols such as NEODOL (sold commercially by Shell Chemical Company), polyether, polyacrylonitriles, polyalkyl acrylates, polyalkyl methacrylates, polyvinyl methyl ethers, polyvinyl ethyl ethers, polyvinyl acetates, polyvinyl alcohols, poly-N-vinylpyrrolidones, polyvinyl methyl ketones, poly(4-vinylphenols), oxazoline polymers, polyalkyleneimines, hydroxyethylcelluloses, polyacetals, glycidyl ethers, glycosides, carboxylic acid esters of polyhydric alcohols, bile acids and their salts, esters or amides, cyclodextrins, phosphorus compounds, unsaturated carboxylic acid esters and ionic surface- or interface-active compounds. Polyether polyols are most preferably used in the process of the present invention.

Where used, functionalized polymers may be present in the DMC catalyst in an amount of from 2 to 80 wt. %, preferably, from 5 to 70 wt. %, more preferably, from 10 to 60 wt. %, based on the total weight of DMC catalyst. The functionalized polymers may be present in the DMC catalyst in an amount ranging between any combination of these values, inclusive of the recited values.

The DMC catalyst may or may not be activated prior to use in the inventive process. Activation, when desired, involves mixing the catalyst with a starter molecule having a desired number of oxyalkylatable hydrogen atoms, and adding alkylene oxide, preferably propylene oxide or other higher alkylene oxide under pressure and monitoring the reactor pressure. The reactor may be advantageously maintained at a temperature of from 90° C. to 150° C., more preferably from 100° C. to 140° C. and most preferably from 110° C. to 130° C. A noticeable pressure drop in the reactor indicates that the catalyst has been activated. The same alkylene oxide as is to be employed in PMPO production may be used to prepare activated catalyst, or a different alkylene oxide may be employed. With higher alkylene oxides having low vapor pressure, a volatile alkylene oxide such as ethylene oxide, oxetane, 1,2-butylene oxide, 2,3-butylene oxide, or isobutylene oxide may be employed in lieu of or in conjunction with the higher alkylene oxide to facilitate pressure monitoring. Alternatively, other methods of measuring alkylene oxide concentration (GC, GC/MS, HPLC, etc.) may be used. A noticeable reduction in free alkylene oxide concentration indicates activation.

A particularly advantageous feature of the present invention is the ability to employ "fresh" DMC catalysts without activation. DMC catalyst activation, as described hereinabove, not only involves additional operator attention, thus increasing processing cost, but requires a pressurized reaction vessel, increasing capital costs as well. "Fresh" catalyst as used herein is freshly prepared, non-activated DMC catalyst, i.e., non-activated DMC catalyst in solid form or in the form of a slurry in low molecular weight starter, polyoxyalkylated low molecular weight starter, or a non-starter liquid. Most preferably, all or a substantial portion of the liquid phase of a fresh DMC catalyst mixture will include the same low molecular weight starter used for continuous starter addition, a polyoxyalkylated low molecular weight starter. The ability of the inventive process to employ fresh, non-activated DMC catalyst allows for significant economies in the commercial production of polymer polyols.

Suitable unsaturated monomers for use in the inventive process include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, nitrostyrene, N,N-dimethylaminostyrene, acetoxystyrene, including halogenated styrenes, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethyoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethylether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, ally alcohol, glycol monoesters of itaconic acid, vinyl pyridine, maleic anhydride, maleimide, N-substituted maleimides, such as N-phenylmaleimide and the like. Preferred unsaturated monomers in the present invention are both styrene and acrylonitrile.

The amount of vinyl monomer(s) fed to the reactor is selected to achieve the desired vinyl polymer solids content in the final polymer polyol product. The solids level may range from as little as 5 wt. % to upwards of 45 wt. %, preferably from 10 wt. % to 30 wt. %, most preferably from 15 wt. % to 25 wt. %, based on the total weight of the components. If a lower solids content polymer polyol is desired, the solids content may be lowered by dilution of the higher solids polyol with further amounts of the same base polyol or other non-polymer polyol, or by blending with a polymer polyol of lesser solids content.

Preferred as radical initiators in the inventive process are the free radical type of vinyl polymerization initiators, such as the peroxides and azo compounds. Specific examples include 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperneodecanoate, t-butylperbenzoate, t-butyl percrotonate, t-butyl perisobutyrate, di-t-butyl perphthalate and 2,2'-azo-bis(2-methylbutanenitrile) available from DuPont as VAZO 67.

The free radical initiator concentration in the formulation is not critical and can be varied within wide limits. As a representative range, the concentration can vary from 0.01 to 5.0 wt. % or greater, based on the total weight of the components. The free radical initiator and temperature should be selected so that the initiator has a reasonable rate of decomposition with respect to the hold-up time in the reactor for a continuous flow reactor or the feed time for a semi-batch reactor.

The process of the present invention may optionally include one or more polymer polyol (PMPO) stabilizers. Suitable stabilizers are those known in the art which stabilize polymer polyols prepared by traditional methods. The stabilizer may be free of induced unsaturation such as those disclosed in U.S. Pat. No. 5,059,641, the entire contents of which are incorporated herein by reference thereto. The stabilizer may contain reactive induced unsaturations which are in general prepared by the reaction of the selected reactive unsaturated compound with a polyol. The terminology "reactive induced unsaturated compound," refers to any compound capable of forming an adduct with a polyol, either directly or indirectly, and having carbon-to-carbon double bonds which are adequately reactive with the particular monomer system being utilized. More specifically, compounds containing $\alpha,\beta$-unsaturation are preferred. Suitable compounds satisfying this criteria include the maleates, fumarates, acrylates, and methacrylates. Although not $\alpha,\beta$-unsaturated compounds, polyol adducts formed from substituted vinyl benzenes such as chloromethylstyrene likewise may be utilized. Illustrative examples of suitable $\alpha,\beta$-unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydrides, methacroyl chloride and glycidyl methacrylate. The level of ethylenic unsaturation in the precursor stabilizer may vary widely. The minimum and maximum levels of unsaturation are both constricted by the dispersion stability that the precursor stabilizer is capable of imparting to the polymer polyol composition. The specific level of unsaturation utilized will further depend on the molecular weight of the polyol used to prepare the precursor stabilizer. More particularly, unsaturation levels of at least 0.04 meq/gm, up to 0.10 meq/gm are particularly suitable. The stabilizer may also be a preformed stabilizer or contain solids which act as "seeds". References for preformed stabilizers and "seeds" include: U.S. Pat. Nos. 5,488,086; 6,013,731; 5,990,185; 6,455,603; 5,814,699; 5,196,476; and U.S. Published Application Nos. 2003-0220410, and 2003-0181598.

The simultaneous polymer polyol production process of the present invention may be continuous or semi-batch. In the semi-batch process, the reactor vessel should preferably be equipped with an efficient means of agitation, for example, an impeller-type stirrer or recirculation loop. A continuous process may be implemented in one or more reactors in series, with the second reactor facilitating substantially complete reaction of monomers with continuous product takeoffs, or may be performed in a continuous tubular reactor with incremental additions of monomers along the length of the reactor. The first reactor preferably should be a continuous, stirred, back-mixed reactor. The components are pumped into the first reactor continuously through an in-line mixer to assure complete mixing of the components before they enter the reactor. The contents of the reactor are well mixed with a residence time of at least 8 minutes, preferably greater than 30 minutes. Residence times are typically between one and eight hours. The product of the first reactor is collected as it flows continuously out of the reactor through a backpressure regulator, which preferably has been adjusted to give some positive backpressure in the reactor.

The inventive process may also be carried out in the presence of an organic solvent, reaction moderator, and/or chain transfer agent. Examples of these materials include, but are not limited to, benzene, toluene, ethylbenzene, xylene, hexane, mercaptans such as dodecylmercaptan, halogenated hydrocarbons, particularly those containing bromine and/or iodine, and the like and enol-ethers.

Following polymerization, volatile constituents, in particular those from the solvent and residues of monomers are preferably stripped from the product by vacuum distillation, optionally, in a thin layer or falling film evaporator. The monomer-free product may be used as is, or may be filtered to remove any large particles that may have been created.

The polymer polyols made by the inventive process are suitable for the preparation of polyurethane foams and elastomers.

EXAMPLES

The present invention is further illustrated, but is not to be limited, by the following examples. The following materials were used in the Examples:

| | |
|---|---|
| DMC Catalyst | zinc hexacyanocobaltate catalyst made essentially according to U.S. Pat. No. 5,482,908; |
| Polyol A | 56 OH No., all-PO starter triol, made according to present Example 1; |
| Polyol B | dispersant no. 6 according to U.S. Pat. No. 5,059,641; |
| Polyol C | 112 OH No. starter triol containing 6 wt % ethylene oxide and 180 ppm of activated DMC catalyst; |
| VAZO 67 | 2,2'-azo-bis(2-methylbutanenitrile) available from DuPont; and |
| LHT-240 | 240 OH No, all-PO triol, available from Bayer Polymers LLC. |

Example 1

Preparation of Polyol A (Activated Starter)

A one-liter reactor (Parr Instrument Co.) was charged with a 1500 MW triol activated starter (300 g) containing DMC Catalyst (150 ppm). Two feeds were prepared: a three-gallon pressure vessel (Pope Scientific Inc.) was charged with propylene oxide (PO) (8800 g) and a one-gallon pressure vessel (Pope Scientific Inc.) was charged with a mixture of 41% LHT-240 and 59% of a 1500 MW triol activated starter (2989 g) containing DMC catalyst (150 ppm).

The reactor was heated to 130° C. while pulling vacuum and isolated. Propylene oxide (30 g) was added and the feed stopped. After three minutes, the pressure dropped from 20 psia to 1 psia. The PO feed was continued at 6 g/min. until a total of 300 g of PO had been added. The feed was stopped. At this point, the pressure in the reactor measured 3 psia. A back pressure regulator between the reactor and the collection vessel was set at 54 psia and the valve connected to the back pressure regulator opened. Both feeds were started (6.6 g/min for PO and 3.4 g/min for the activated starter mix). The feeds were continued until the product overflowed the reactor and filled the collection vessel. When it was estimated that there was 400 g in the collection vessel, the vessel was heated to 130° C. When 700 g was in the vessel, the flow was diverted to a slop tank for five minutes while the polyol was stripped and drained. In this way, seven "cuts" were collected of five residence times (5000 g). At this point, the reactor was isolated and cooled while full of an all PO triol having a hydroxyl number of about 56. The final cut had an OH No. of 55.2 meq/g KOH and 0.004 unsaturation.

Example 2

Preparation of PMPO by Continuous Process

Two feeds were prepared as detailed below.

| Feed A | | Feed B | |
|---|---|---|---|
| VAZO 67 | 26.4 g | propylene oxide | 8800.0 g |
| styrene | 489.0 g | | |
| acrylonitrile | 238.0 g | | |
| 1.5 K activated starter* | 1322.0 g | | |
| LHT-240 | 925.0 g | | |

*1.5 K activated starter contained 150 ppm DMC catalyst

The reactor from Example 1 (with Polyol A produced in Example 1) was opened to the back pressure regulator, which was set to 54 psia. The reactor was heated to 115° C. and both feeds A and B were started. The targeted feed rates were 4.5 g/min. for Feed A and 6.6 g/min. for Feed B (PO). The same procedure as in Example 1 was followed. To collect a fraction, flow was diverted to a slop tank and the material in the collection vessel stripped. A total of 896 g of Feed B (PO) and 568 g of Feed A were fed to the reactor before the run was stopped. The contents of the reactor were analyzed for viscosity (1218 cst at 25° C.) and particle size (average mean diameter was 2.52 microns). The polymer polyol had an OH No. of 50 meq/g KOH.

Example 3

Preparation of PMPO by Continuous Process

The procedure disclosed in Example 1 was followed to provide a full reactor of Polyol A. This reaction was conducted at 115° C. The reaction was stopped and two new feeds were prepared as detailed below.

| Feed A | | | Feed B | |
|---|---|---|---|---|
| 1.5 K act. starter* | 1744 g (58.1%) | acrylonitrile | | 257 g (4.7%) |
| LHT-240 | 1221 g (40.7%) | styrene | | 530 g (9.6%) |
| VAZO 67 | 35 g (1.1%) | propylene oxide | | 4731 g (85.7%) |
| Total | 3000 g | Total | | 5518 g |

*1.5 K act. starter contained 150 ppm DMC catalyst

The two feeds were turned on, targeting 3.5 g/min. for Feed A and 7.7 g/min. for Feed B. These feed rates target 10% solids. Nine fractions of 650 g were collected for a total of six residence times. Fractions 8 and 9 were analyzed. Viscosity was 1156 cst at 25° C. The average particle size was 6.7 microns diameter. The polymer polyol produced had an OH No. of 50 meq/g KOH.

Example 4

Preparation of PMPO by Semi-Batch Process (Prophetic)

| Feed Mix: | |
|---|---|
| Propylene Oxide | 791 g |
| Ethylene Oxide | 140 g |
| Styrene | 280 g |
| Acrylonitrile | 120 g |
| VAZO 67 | 10 g |

A two-liter pressure vessel is charged Polyol A (233 g), Polyol B (36 g), and DMC catalyst (0.035 g). With stirring, the reactor contents are heated under vacuum while sparging with nitrogen to 120° C. and held at 120° C. for 15 minutes. After stopping vacuum and nitrogen sparge, about 30 g of the feed mix is added to the reactor over a period of about 10 minutes. The feed is stopped to ensure the pressure in the reactor drops. After confirming activation, the remainder of the feed mix is added to the reactor over a period of about 3 hours at 120° C. with stirring. Upon completion of the addition, the dispersion is held at reaction temperature for 0.25-0.5 hours. The reaction mixture is stripped of residual monomers for 1.5-2.5 hours at 110-130° C., and less than 5 mm Hg yielding a polymer polyol product having a hydroxyl number of approximately 36 meq/g KOH.

Example 5

Preparation of PMPO by Semi-Batch Process
(Prophetic)

| Feed Mix: | |
|---|---|
| Propylene Oxide | 840 g |
| Ethylene Oxide | 111 g |
| Glycerin | 16.1 g |
| Propylene glycol | 3.1 g |
| Styrene | 280 g |
| Acrylonitrile | 120 g |
| VAZO 67 | 10 g |

A two-liter pressure vessel is charged Polyol C (194 g) and Polyol B (36 g). With stirring, the reactor contents are heated under vacuum while sparging with nitrogen to 120° C. and held at 120° C. for 15 minutes. After stopping vacuum and nitrogen sparge about 30 g of the feed mix is added to the reactor over a period of about 10 minutes. The feed is stopped to ensure the pressure in the reactor drops. After confirming activation, the remainder of the feed mix is added to the reactor over a period of about 3 hours at 120° C. with stirring. Upon completion of the addition, the dispersion is held at reaction temperature for 0.25-0.5 hours. The reaction mixture is stripped of residual monomers for 1.5-2.5 hours at 110-130° C. and less than 5 mm Hg yielding a polymer polyol product having a hydroxyl number of approximately 36 meq/gm KOH.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A continuous process for the preparation of a polymer polyol (PMPO) comprising:
   a) introducing into a continuous reactor sufficient DMC catalyst/initial starter mixture to initiate polyoxyalkylation of the initial starter after introduction of alkylene oxide into the reactor;
   b) continuously introducing into the reactor at least one continuously added starter;
   c) continuously introducing into the reactor fresh DMC catalyst and/or further DMC catalyst/further starter mixture such that catalytic activity is maintained;
   d) continuously introducing into the reactor at least one unsaturated monomer;
   e) continuously introducing into the reactor at least one radical initiator;
   f) continuously introducing into the reactor at least one alkylene oxide and optionally, at least one polymer polyol (PMPO) stabilizer, to produce the polymer polyol (PMPO); and
   g) continuously removing the polymer polyol (PMPO) from the reactor,
wherein the process simultaneously alkoxylates the starter and polymerizes the unsaturated monomer, thereby simultaneously forming a polyoxyalkylene polyol and forming discrete polymer particles to produce a polymer polyol (PMPO) in one reactor.

2. The continuous process according to claim 1, wherein the initial starter is chosen from polyoxypropylene polyols, polyoxyethylene polyols, polytetatramethylene ether glycols, glycerol, propoxylated glycerols, propylene glycol, ethylene glycol, diethylene glycol, triethylene glycol, dipropylene glycol, tripropylene glycol, trimethylol propane, alkoxylated allylic alcohols, bisphenol A, pentaerythritol, sorbitol, sucrose, degraded starch, water and mixtures thereof.

3. The continuous process according to claim 1, wherein the at least one continuously added starter is chosen from polyoxypropylene polyols, polyoxyethylene polyols, polytetatramethylene ether glycols, glycerol, propoxylated glycerols, propylene glycol, ethylene glycol, diethylene glycol, triethylene glycol, dipropylene glycol, tripropylene glycol, trimethylol propane, alkoxylated allylic alcohols, bisphenol A, pentaerythritol, sorbitol, sucrose, degraded starch, water and mixtures thereof.

4. The continuous process according to claim 1, wherein the at least one unsaturated monomer is chosen from butadiene, isoprene, 1,4-pentadiene, 1,6-hexadiene, 1,7-octadiene, styrene, acrylonitrile, methacrylonitrile, α-methyl-styrene, methylstyrene, 2,4-dimethylstyrene, ethyl styrene, isopropylstyrene, butylstyrene, cyanostyrene, phenylstyrene, cyclohexylstyrene, benzylstyrene, nitrostyrene, N,N-dimethylaminostyrene, acetoxystyrene, halogenated styrenes, methyl 4-vinylbenzoate, phenoxystyrene, p-vinyl diphenyl sulfide, p-vinylphenyl phenyl oxide, acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethyoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butyl-acrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethylether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, ally alcohol, glycol monoesters of itaconic acid, vinyl pyridine, maleic anhydride, maleimide and N-substituted maleimides.

5. The continuous process according to claim 1, wherein the at least one unsaturated monomer is a mixture of styrene and acrylonitrile.

6. The continuous process according to claim 1, wherein the at least one radical initiator is chosen from 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperneo-decanoate, t-butylperbenzoate, t-butyl percrotonate, t-butyl perisobutyrate, di-t-butyl perphthalate and 2,2'-azo-bis(2-methylbutanenitrile).

7. The continuous process according to claim 1, wherein the at least one radical initiator is 2,2'-azo-bis(2-methylbutanenitrile).

8. The continuous process according to claim 1, wherein the at least one alkylene oxide is chosen from ethylene oxide, propylene oxide, 1,2- and 2,3-butylene oxide, isobutylene oxide, epichlorohydrin, cyclohexene oxide and styrene oxide.

9. The continuous process according to claim 1, wherein the at least one alkylene oxide is propylene oxide.

10. The continuous process according to claim 1, wherein the at least one polymer polyol (PMPO) stabilizer is an epoxy-modified polyol.

11. The continuous process according to claim 1 further including a solvent or a polymer control agent.

12. The continuous process according to claim 1, wherein the polymer polyol (PMPO) stabilizer is a polyether having induced unsaturation.

\* \* \* \* \*